E. G. BARTLETT.
RAKE MACHINE.
APPLICATION FILED DEC. 7, 1908.
918,816.
Patented Apr. 20, 1909.
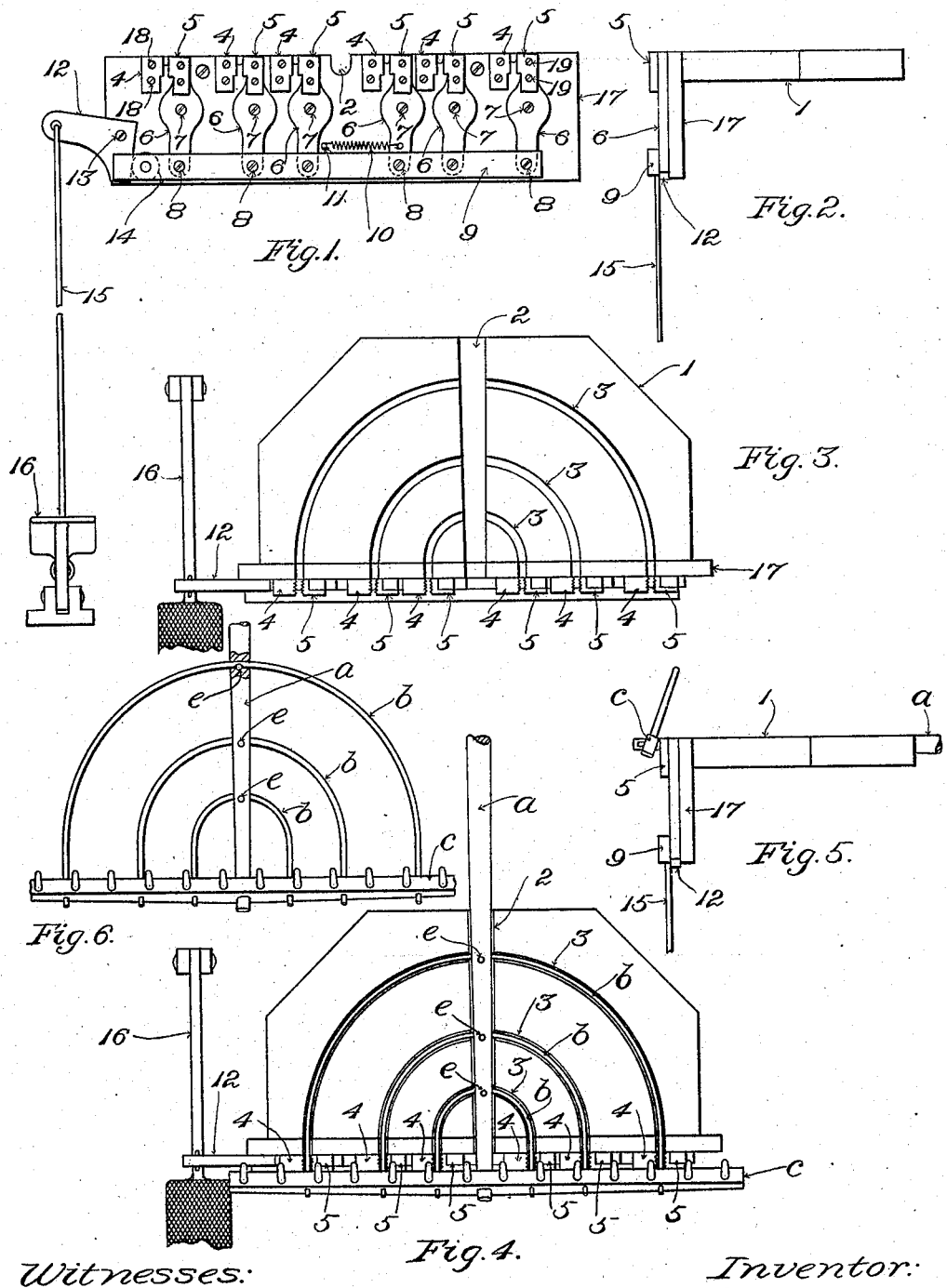
Witnesses:
Oscar F. Hill
Edith J. Anderson.
Inventor:
Elroy G. Bartlett
by Chas. F. Randall
Attorney.

UNITED STATES PATENT OFFICE.

ELROY G. BARTLETT, OF TAMWORTH, NEW HAMPSHIRE.

RAKE-MACHINE.

No. 918,816.　　　Specification of Letters Patent.　　　Patented April 20, 1909.

Application filed December 7, 1908. Serial No. 466,277.

*To all whom it may concern:*

Be it known that I, ELROY G. BARTLETT, a citizen of the United States, residing at Tamworth, in the county of Carroll, State of New Hampshire, have invented a certain new and useful Improvement in Rake-Machines, of which the following is a specification, reference being had therein to the accompanying drawings.

The invention relates to the manufacture of hand hay- or lawn-rakes, and more particularly of those having metal bows. Rakes having bows of solid steel bent to shape have been made by me for some time past.

The object of this invention is to provide means for facilitating the operation of heading or riveting the ends of metal bows, after they have been passed through holes in the head of a rake, to secure the head in place upon such ends.

The invention consists in clamp or vise devices by which the bows of a rake, after having been assembled in the required relations with the handle and head, may be held securely while the ends or extremities thereof are being operated upon to secure the head in place.

A convenient embodiment of the invention is shown in the drawings combined with a form constructed to receive the handle and bows of a rake after having been assembled together, and hold them while the head is applied to the ends of the bows, and during the operations by which the ends of the bows are trimmed off and headed or riveted down.

Figure 1 is a front elevation thereof. Fig. 2 is a side elevation, with the treadle omitted. Fig. 3 is a plan view. Fig. 4 is a plan view, with a rake applied. Fig. 5 is a side elevation with a rake applied. Fig. 6 shows a portion of a rake, partly in section.

Only such mechanical devices are shown, or will be referred to in this description, as are necessary to an understanding of the invention and the manner of employing the same. To assist in such understanding I have shown a rake of the construction usually made by me with the aid of the invention, and the details thereof will first be referred to briefly.

In Figs. 4, 5 and 6, the rake-handle is marked *a*, the bows are designated *b, b, b*, and the head is marked *c*. The middle portions of the bows occupy holes made transversely through the handle, and the end-portions of the bows occupy holes made through the head. To lock the handle to the middle portions of the bows, so as to prevent relative movement transversely, each of the bows has a nick, formed therein, at the middle of its length, as indicated in Fig. 6, and a nail *e* driven through the handle at right angles to the bow occupies such nick.

Referring now to the form shown at 1, it is of a character heretofore employed. It has a groove 2 for the reception of the handle *a* of a rake, and a series of curved grooves 3, 3, 3, for the reception of the bows *b, b, b*. In making a rake, the handle and bows are assembled and fitted together, and the locking nails *e, e, e*, are driven into the handle, before such parts are applied to the form. See Figs. 4 and 5. The handle and bows having been placed within the grooves of the form, the head of the rake is applied to the ends of the handle and bows, and, such ends having been caused to enter the holes made through the head for their reception, the head is pushed into place upon such ends, as in Figs. 4 and 5. The ends are trimmed off at the outer side of the head to remove excess of length, and then the operation of heading or riveting the extremities of the bows is performed.

The clamp or vise devices in which the invention resides are arranged at or adjacent the ends of the grooves 3, 3, 3, of the form. They may be variously constituted, constructed, and arranged in practice.

The illustrated form of the invention comprises a number of pairs of jaws, each pair consisting of a fixed jaw 4 and a movable jaw 5, separating by a transverse movement so as to leave a vertical opening between them. The jaws of the respective pairs are so arranged with relation to the said ends of the grooves that when the jaws are opened or separated the openings are in line with the corresponding ends of the grooves, and when a rake-handle and connected bows are applied to the form the end-portions of the bows pass down into such openings, thus entering between the jaws into position to be grasped by the latter as they close. In applying the rake-head to the ends of the handle and bows, it is forced thereon at the outer side of the series of jaws. In the closed condition of the jaws, they clasp and hold the bows immediately adjacent the inner side of the rake-head.

The means for actuating the clamp or vise devices may vary in practice. As a convenient means of providing therefor in the present instance, the movable jaws are shown provided in connection with levers 6, 6, etc., which are mounted upon pivots 7, 7, etc. The levers are all connected by pivots 8, 8, etc., to a bar 9, so that the movable jaws are compelled to move in unison. A contracting spiral spring 10 having one end thereof engaged with one of the levers 6, and the other engaged with a fixed point 11, acts with a tendency to open the jaws and keep them open normally. To enable the jaws to be closed to grasp the bows, an operating lever 12 is provided, it being pivoted at 13 and arranged to act by one arm thereof against an anti-friction roll 14 mounted upon bar 9. The other arm of the lever is jointed by means of a rod or link 15 to an operating treadle 16. When such treadle is moved by the workman, the lever is turned so as to move the bar 9 lengthwise in the direction to turn the jaw-carrying levers 6, 6, etc., so as to close the jaws upon the bows between them. When the pressure upon the treadle is relieved, the spring 10 acts to move the parts in the reverse direction so as to open the jaws and release the bows.

The acting faces of jaws 4, 5, are serrated in order to bite into the bows so as to hold them effectually against tendency to displacement under the blows by which the heading or riveting is effected.

For convenience of construction, the fixed jaws 4, 4, etc., are formed as blocks which are removably secured in place upon the support 17 by screws 18, 18, etc. An injured block may be removed and replaced by a new one. The acting portions of jaws 5, 5, etc., are removably secured by screws 19, 19, etc., upon the levers 6, 6, etc. to enable them to be replaced when worn or injured, without having to replace the levers also.

I claim as my invention:—

1. In a rake-machine, the combination with means to receive the assembled handle and bow or bows of a rake and hold the same while the rake-head is applied thereto, of clamp or vise devices which engage with the bow-ends adjacent the rake-head and hold the same from lengthwise displacement during the operation of heading or riveting the extremities of the bows.

2. In a rake-machine, the combination with means for holding the assembled handle and bow or bows of a rake while the rake-head is applied thereto, of clamp or vise devices presenting vertical openings which receive the bow-ends adjacent the rake-head, the said devices operating to hold the bow-ends from lengthwise displacement during the operation of heading or riveting the extremities thereof.

3. In a rake-machine, the combination with a form having grooves to receive the assembled handle and bow or bows of a rake, of clamps located in position to close upon bows occupying the said form, and operating to hold the bows against lengthwise displacement while being headed or riveted to secure the rake-head.

4. In a rake-machine, the combination with a form to receive the assembled handle and bow or bows of a rake, of a series of pairs of jaws opening transversely to receive the end-portions of the said bow or bows as applied to the form, and means for operating said jaws.

5. In a rake-machine, the combination with means to receive the assembled handle and bow or bows of a rake, of a series of pairs of jaws opening transversely and arranged to receive the end-portion of said bow or bows in being applied to the said means, each pair comprising a fixed jaw and a movable jaw, and means for operating the movable jaws simultaneously.

In testimony whereof I affix my signature in presence of two witnesses.

ELROY G. BARTLETT.

Witnesses:
WM. M. REMICK,
LELAND C. BARTLETT.